US006815016B2

(12) United States Patent
Kyu et al.

(10) Patent No.: US 6,815,016 B2
(45) Date of Patent: Nov. 9, 2004

(54) ELECTRICALLY TUNABLE MICROLENS ARRAY FORMED BY PATTERN POLYMERIZATION OF PHOTOPOLYMERIZABLE MIXTURES CONTAINING LIQUID CRYSTALS

(75) Inventors: Thein Kyu, Akron, OH (US); Domasius Nwabunma, Woodbury, MN (US)

(73) Assignee: The University of Akron, Akron, OH (US)

(*) Notice: Subject to any disclaimer, the term of this patent is extended or adjusted under 35 U.S.C. 154(b) by 47 days.

(21) Appl. No.: 10/312,461

(22) PCT Filed: Jun. 22, 2001

(86) PCT No.: PCT/US01/19975

§ 371 (c)(1),
(2), (4) Date: Dec. 23, 2002

(87) PCT Pub. No.: WO02/01280

PCT Pub. Date: Jan. 3, 2002

(65) Prior Publication Data

US 2004/0105048 A1 Jun. 3, 2004

Related U.S. Application Data

(60) Provisional application No. 60/213,833, filed on Jun. 23, 2000.

(51) Int. Cl.[7] ............................................. C09K 19/00
(52) U.S. Cl. ........................ 428/1.1; 349/95; 349/183
(58) Field of Search ................... 428/1.1, 1.3, 1.31; 252/299.01; 349/95, 183

(56) References Cited

U.S. PATENT DOCUMENTS

| | | | |
|---|---|---|---|
| 5,108,650 A | 4/1992 | Koden et al. | |
| 5,204,227 A | * 4/1993 | Larimer | ....................... 430/331 |
| 5,211,877 A | 5/1993 | Andrejewski et al. | |
| 5,716,542 A | 2/1998 | Iwaya et al. | |
| 5,886,760 A | 3/1999 | Ueda et al. | |
| 5,942,157 A | 8/1999 | Sutherland et al. | |
| 5,949,508 A | 9/1999 | Kumar et al. | |
| 5,963,186 A | 10/1999 | Hughes et al. | |
| 5,972,242 A | 10/1999 | Takigawa et al. | |
| 6,059,994 A | 5/2000 | Chan | |

FOREIGN PATENT DOCUMENTS

| | | |
|---|---|---|
| EP | 0932081 | 7/1999 |
| WO | WO 00/57216 | 9/2000 |
| WO | WO 00/57261 | 9/2000 |
| WO | WO 02/01280 | 1/2002 |

OTHER PUBLICATIONS

Yamazoe Hiroshi, Patent Abstracts of Japan, Application No. 08096497, Oct. 31, 1997.

*Synthesis and Photopolymerization of Cholesteric Liquid Crystalline Diacrylates,* Liquid Crystals, Lub, Broer, Hikmet, Nierop, 1995, vol. 18, No. 2, pp. 319–326.

* cited by examiner

*Primary Examiner*—Mark F Huff
*Assistant Examiner*—Jennifer R. Sadula
(74) *Attorney, Agent, or Firm*—Roetzel & Andress

(57) ABSTRACT

An electrically tunable microlens array. The array is formed by pattern photopolymerization of photoreactive mixtures comprising a polymerizable material and liquid crystals; wherein the photopolymerization is characterized by the interaction of multiple-wave mixing. The liquid crystals are contained as droplets in regions between the polymerized material.

6 Claims, 4 Drawing Sheets

Array and Checker Board Pattern of Spherical Droplets

Array Checker Board of Pattern Elliptical of Droplets

ELECTRICALLY TUNABLE MICROLENS ARRAY FORMED BY PATTERN POLYMERIZATION OF PHOTOPOLYMERIZABLE MIXTURES CONTAINING LIQUID CRYSTALS

This application claims the benefit of provisional 60/213,833 filed on Jun. 23, 2000.

TECHNICAL FIELD

The present invention relates to electrically tunable microlens arrays prepared by pattern polymerization of photopolymerizable mixtures containing liquid crystals. More specifically, the invention relates to polymer dispersed liquid crystals photopolymerized by using multiple-wave mixing.

BACKGROUND OF THE INVENTION

Liquid crystals have long been utilized in the prior art for their ability to change their optical orientation in the presence of an electric field. As thin films, liquid crystals are widely used in various electro-optical display and control applications such as optical switches, variable transparency windows, and large area flat panel displays. In all these devices, the anisotropic electrical and optical properties of liquid crystals are exploited by switching them between a strong scattering OFF state to a transparent light transmitting ON state using external electric fields.

Polymer dispersed liquid crystal display devices are increasingly desired due to production ease and display brightness. Polymer dispersed liquid crystals (PDLCs) are formed from a homogeneous mixture of prepolymer and liquid crystals. As the polymer cures, the liquid crystals separate out as a distinct microdroplet phase. If the polymer is a photopolymer, this phase separation occurs as the prepolymer is irradiated with light. When a PDLC blend is subjected to an externally applied electric field above a certain value, the liquid crystal molecules are oriented parallel to the field direction. In this oriented state, the film will be transparent to the naked eye since the ordinary refractive index of the liquid crystal can be matched approximately to that of the polymer. When the electric field is turned off, the blend switches back to its scattering turbid state.

Another area of interest for liquid crystal materials is for use in microlens because of their tunable focal length that are crucial for optical beam steering and image processing. The principle of focal length tuning of a microlens is illustrated in FIG. 1. Therein, the microlens is designated generally by the numeral 100, and consists of a liquid crystal droplet 100 to defined by polymer walls 104. The liquid crystal droplet 102 and polymer 104 are contained between substrates of transparent glass 106 having an indium-tin-oxide (ITO) electrode layer 108 thereon. In the absence of an external electric field, the liquid crystal directors 110 are randomly oriented, causing light to scatter. When a voltage is applied across the liquid crystal micro-droplet, as shown in FIG. 1, the liquid crystal directors 110 tend to align toward field direction, e.g., along the droplet curvature near the surface, but tend to become straight near the center. The curvature of the liquid crystal alignment may be altered by the electrical field, which in turn guides the incoming light waves 112 to convert to a focal point 114. In this manner, the focal length can be tuned by controlling the applied voltage.

The liquid crystal microlens, hither to reported, have been fabricated by drilling holes on ITO coded glass electrodes in filling with liquid crystals. Another way of fabricating the microlens is through pattern-photo polymerization of liquid crystal/photo-curable monomer mixtures by either masking with an array of black dots or patterning with parallel electrodes. However, these drilled holes or masking dots or microelectrodes are too large to fabricate microlenses of nano-sizes; most microlens thus produced are at best in the range of a few hundred microns in size. For better image resolution, it is desirable to reduce the microlenses size to a few hundred nanometers or smaller, which motivates the present study.

One drawback to liquid crystal display devices is that the display quality is dependent on the angle of observation. U.S. Pat. No. 5,886,760, to Ueda et al., discloses a microlens array in the liquid crystal display device that widens the viewing angle. The microlens array is formed by polymerizing a transparent resin within the apertures of a mesh-like sheet. The polymerization is accomplished by using an energy beam with a UV ray or an electron beam, or by thermosetting. The size of each microlens is dependent on the mesh size of the sheet, which is limited to 100 to 600 mesh. The limited range of microlens size restricts the resolution which can be achieved with a microlens array formed using a mesh-like sheet.

Other methods which have been used to control microlens size and shape include drilling micropores on glass substrates or masking the UV rays. In these methods, the size of the microlens are on the order of 300 to 500 microns. Smaller microlenses are needed to provide the type of resolution required by applications such as medical imaging, diffraction grating, and beam steering.

Droplet size affects switching voltage, switching speed, and contrast ability.

In general, smaller droplets require higher switching voltage, longer switching times, and provide better contrast. In addition to droplet size, the shape and uniformity of the droplets affects the performance characteristics of the polymer dispersed liquid crystal displays. The arrangement and uniformity of the dispersion of the liquid crystals in the polymer matrix should also be considered. These characteristics of the polymer dispersed liquid crystal are sometimes referred to as the domain morphology. Using conventional radiation curing techniques, illumination of the uncured sample is uniform, and phase separation occurs as a random process in which droplets form throughout the sample. Likewise, thermal polymerization is a bulk curing method in which the whole sample is heated. Droplet size is generally controlled indirectly by, for example, adjusting relative amounts of monomer, chain extender, surfactant, and other components. U.S. Pat. No. 5,949,508 to Kumar et al. discloses a technique which preferentially exposes one side of a cell containing prepolymer material and liquid crystals to UV radiation. This causes a polymer layer to form adjacent to the side nearest the UV light source. By controlling the power, collimation, and exposure time of the UV light, grooves, channels or patterns can be formed which can receive liquid crystal material. Uniformity of size, shape, and position of the liquid crystals is difficult to achieve, but in general, droplet size is on the order of at least 400 micrometers. Non-uniformity contributes to scattering and erodes the optical performance of the liquid crystal display.

U.S. Pat. No. 5,942,157, to Sutherland et al., describes the use of two-wave mixing in the production of volume hologram materials. The PDLC is exposed to coherent light to produce an interference pattern inside the material. This technique produces clear, orderly rows of polymer dispersed liquid crystal having uniform size and shape. These polymer dispersed liquid crystal materials are then useful for recording volume diffraction grating in 1-dimension.

Because the performance and capabilities of polymer dispersed liquid crystal displays are critically affected by the domain morphology of the PDLC, a process is needed to effectively control the liquid crystal droplet size, shape, number, and arrangement within the polymer matrix. Such a process would preferably be reproducible and produce higher yields in fabricating polymer dispersed liquid crystal devices.

SUMMARY OF THE INVENTION

For purposes of the present disclosure, by "multiple-wave mixing" or "mixing of multiple electromagnetic waves" it is meant the creation of an interference pattern inside a target material by the use of at least four electromagnetic waves to yield 2- or 3-dimensional (2-D or 3-D) diffraction grating. The term "photopolymerizable material" is to be understood to encompass either monomers having photopolymerizable functional groups or monomers intermixed with photoinitiator dyes such that the monomers within the mixture will be polymerized upon photoinitiation of polymerization.

The present invention relates to polymer dispersed liquid crystals prepared by the pattern photopolymerization of photoreactive mixtures comprising a photopolymerizable material and liquid crystals, wherein the photopolymerization is characterized by the use of multiple-wave mixing.

The present invention further relates to a process of preparing polymer dispersed liquid crystals, the process comprising the steps of providing a photoreactive mixture comprising a photopolymerizable material and liquid crystals; exposing the mixture to a radiation pattern, wherein the radiation pattern results from the mixing of multiple electromagnetic waves; and polymerizing the photopolymerizable material.

The present invention also relates to an electrically tunable microlens array comprising polymer dispersed liquid crystals prepared by the pattern photopolymerization of photoreactive mixtures comprising a photopolymerizable material and liquid crystals, wherein the photopolymerization is characterized by the use of multiple-wave mixing.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
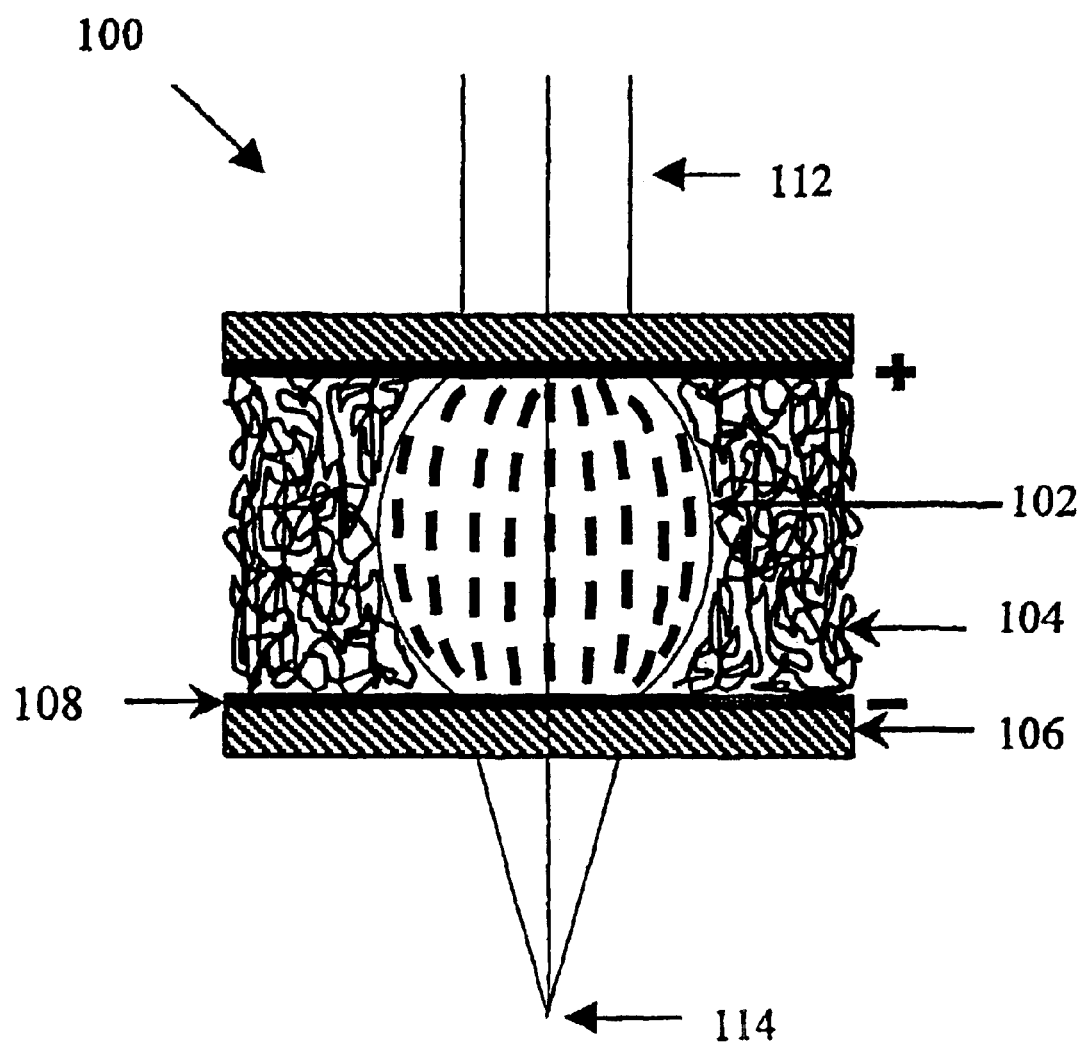
FIG. 1 is a schematic illustration of the principle of focal length tuning of a microlens.

Disclosed herein is a method of fabricating microlens via photopolymerization induced phase separation of liquid crystal and monomer/oligomer mixtures, respectively, based on a multiply-wave mixing techniques, i.e. an at least four-wave mixing technique. The method disclosed herein is distinguishable from prior art methods employed to produce holographic polymer dispersed liquid crystals in which liquid crystal stripes are formed by the interference of two planar UV waves, because liquid crystal microlens arrays are herein formed by the interference of at least two horizontal and at least two vertical electromagnetic waves, to yield 2-D diffraction, and six waves to yield 3-D diffraction.

Advantageously, it has been found that by controlling the size and arrangement of liquid crystal droplets within a polymer network through the use of multiple wave mixing, the domain morphology of the polymer dispersed liquid crystal can also be controlled. The well ordered alignments of microdroplet arrays can be used as switchable microlens arrays with tunable focal lengths. Problems of irreproducible domain morphology associated with the indiscriminate irradiation or bulk thermal treatment used in the prior art are eliminated. Higher yields in fabricating polymer dispersed liquid crystal devices are achieved. Superior electrically tunable microlens arrays, with greater resolution and less scattering, are obtained.

The electrically tunable microlens array of the present invention includes polymer dispersed liquid crystals. The polymer dispersed liquid crystals are prepared by the pattern photopolymerization of photoreactive mixtures comprising a polymerizable material and liquid crystals, wherein the photopolymerization is characterized by the use of multiple-wave mixing. Preferably, the number of waves for multiple-wave mixing is 4, 6, or 8.

The polymerizable material comprises single or multi-functional monomers or oligomers capable of being photopolymerzed either alone or with suitable photoinitiator dyes. Monomers that, when polymerized, provide a suitable matrix for liquid crystals for use as PDLC films are known. Suitable non-limiting examples of monomers useful in the polymerizable material of the present invention include, but are not limited to, acrylates, methacrylates, thiols, alkyl ethers, aromatic analogs of the preceding, and mixtures thereof. Suitable, non-limiting examples of oligomers useful in the polymerizable material of the present invention include, but are not limited to, dimers, trimers, and tetramers of acrylates, methacrylates, thiols, alkyl ethers, aromatic analogs of the preceding, and mixtures thereof.

The polymerizable material of the present invention will typically make up form about 2 to 80% by weight of the polymer dispersed liquid crystal. The polymerizable material, however, is not necessarily made up only of the monomers/oligomers disclosed above. Notably, optional materials may be employed as part of the polymerizable material, as will be disclosed hereinbelow. More preferably, the polymerizable material will make up from 50 to 70% by weight of the polymer dispersed liquid crystal. Even more preferably, the polymerizable material will make up from about 60 to about 65% by weight of the PDLC.

The liquid crystals utilized in the microlens array of the present invention may be nematic liquid crystals, cholesteric liquid crystals, smectic liquid crystals, ferro-electric liquid crystals, or antiferro-electric liquid crystals, and mixtures thereof. In accordance with weight percentages disclosed above with respect to the polymerizable material, the liquid crystals make up from 20 to 98% by weight of PDLC. Preferably, the liquid crystals make up from about 36 to 50% by weight, and even more preferably 35 to 40% by weight of the PDLC.

Types of nematic liquid crystals suitable for use in the microlens array of the present invention include, but are not limited to, homologs of cyanobiphenyl derivatives, such as alkyl derivatives, preferably with from 3 to 12 carbon atoms.

Specific examples of alkyl derivatives of cyanobiphenyl include p-propyl cyanobiphenol, and p-butyl cyanobiphenol. Alkoxy derivatives of cyanobiphenyl are also useful, preferably with from 3 to 12 carbons, and include p-butoxy cyanobiphenol, and p-hexoxy cyanobiphenol. Alkyl and alkoxy cyanobiphenyl derivatives having from 3 to 12 carbon atoms and mixtures thereof are commercially available from a variety of sources including E. Merck Industries. Suitable materials having cholesteric properties are disclosed, for example, in J. Lub, D. J. Broer, A. M. Hikmet and KG. Nierop, LIQ. CRYST. 18,319 (1995). For example, use can be made of cholesteric monomers, oligomers, or polymers, or mixtures of cholesteric monomers, oligomers, or polymers with chiral monomers, or mixtures of cholesteric monomers, oligomers or polymers with achiral monomers or mixtures of cholesteric oligomers with chiral and achiral monomers or mixtures of achiral monomers, oligomers or polymers having liquid-crystalline phases with chiral monomers. Specific examples are cholesteric polysiloxane-based oligomers. Cholesteric polysiloxane-based oligomers which contain cholesterol derivatives or isomeric cholesterol derivatives as chiral species are disclosed, for example, in U.S. Pat. No. 5,211,877.

Smectic liquid crystals are known in the art, and are discussed, for example, in U.S. Pat. No. 5,972,242. Examples of ferro-electric liquid crystals are disclosed in the prior art. See, for example, U.S. Pat. No. 6,059,994 to Chan et al, and U.S. Pat. No. 5,963,186 to Hughes et al. Descriptions of antiferro-electric liquid crystals are given in U.S. Pat. No. 5,108,650 to Koden et al, and U.S. Pat. No. 5,716,542 to Iwaya et al.

The photoreactive mixture of the present invention optionally further includes at least one of photoinitiators dyes, coinitiators, chain extenders, crosslinking agents, and surfactants. Photoinitiator dyes, as indicated above, are employed when the monomers themselves do not contain photopolymerizable groups. Such dyes are typically employed in the range of about 0.5 to about 5% by weight. Co-initiators may be employed to control the rate of curing in the free radical polymerization reaction of the prepolymer material that is initiated upon irradiation with light. Such co-initiators are typically employed in the range of from about 0.5 to about 5% by weight. Employing a chain extender may help to increase the solubility of the components of the photoreactive mixtures, and may increase the rate of polymerization. Generally, a chain extender, if employed, will be present in a range of from about 10 to about 30% by weight. Surfactants may be employed to lower the switching voltage of the microlens, and are typically present in a range of from about 1 to about 10% by weight.

Specific examples of photoinitiator dyes suitable for the practice of the present invention include, but are not limited to, rose bengal ester (2,4,5,7-tetraiodo-3',4',5',6'-tetrachlorofluorescein-6-acetate ester), rose bengal sodium salt, eosin, eosin sodium salt, 4,5-diiodosuccinyl fluorescein, camphorquinone, methylene blue, benzophenone, benzil, Michler's ketone, 2-chlorothiozantone, 2,4-diethylthioxanantone, benzoin ethyl ether, diethoxyacetophenone, benzildimethylketal, 2-hydroxy-2-methylpropiophenone, 1-hydroxycyclohexyl phenyl ketone, and the like.

Suitable coinitiators which may be used in the practice of the present invention include, but are not limited to N-phenyl glycine, triethylene amine, triethanolanine, N,N-dimethyl-2,6-diisopropyl aniline, and the like. Chain extenders which may be used in the practice of the present invention include N-vinyl pyrrolidone, N-vinyl pyridine, acrylonitrile, N-vinyl carbazole, and the like.

Surfactants, if employed, are preferably cationic surfactants. Suitable surfactants include, but are not limited to, surfactants derived from octanoic acid, heptanoic acid, hexanoic acid, dodecanoic acid, decanoic acid, and the like.

In accordance with the invention there is further provided a process for preparing polymer dispersed liquid crystals, the process comprising the steps of providing a photoreactive mixture comprising a photopolymerizable material and liquid crystals; exposing the photoreactive mixture to a radiation pattern, wherein the radiation pattern results from the mixing of multiple electromagnetic waves; and polymerizing the photopolymerizable material. In the process of the present invention, the photopolymerizable material and liquid crystals are combined, and blended to provide a homogeneous mixture. Said mixture is then placed between two substrates. Transparent substrates are typically used, and examples thereof include glass and plastic. Preferably, an electrode layer is positioned on the inside surfaces of the substrates. Any suitable electrode can be used, such as indium-tin-oxide (ITO). Optionally, an alignment layer may be disposed over the electrode layer. Any alignment layer may be used that does not interfere with the results obtained by the present invention.

The photoreactive mixture is then irradiated. For the purposes of the present invention, four-wave mixing is meant to describe the interaction of two pairs of electromagnetic waves, i.e. at least four waves. The interference of these two pairs of photon beams sets up periodic bright and dark fringes within the mixture. Since the polymerization rate is proportional to the square root of intensity, polymerization occurs faster in the bright regions and more slowly in the dark regions. Monomer diffuses to the bright regions and liquid crystal toward the dark regions. At some point, crosslinking occurs, and the result is a well-ordered arrangement of liquid crystal microdroplets dispersed within a polymer matrix.

By adjusting the diffractive optics, the size and number of liquid crystal microdroplets can be controlled. The droplet size may range from about 30 nanometers to about 300 micrometers. The number of microdroplets in the array will depend on the sample size and the size of the microdroplets, but may vary from about 100×100 for diffractive optics to about 10,000×10,000 for infrared sensors.

The diffractive optics may be adjusted by altering the wavelengths and angles of incidence of the multiple electromagnetic waves. Typically, smaller wavelengths will yield smaller droplets sizes. The smaller the angle of incidence, the larger the periodicity of the liquid crystal arrays. Likewise, the larger the angle of incidence, the smaller the periodicity of the liquid crystal arrays. In the present invention, electromagnetic waves having wavelengths of from 350 to 800 $\mu$m may be employed, with wavelengths of from 380 to 550 nm being preferred.

Advantageously, by controlling the droplet size and arrangement through the use of multiple wave mixing, the domain morphology of the polymer dispersed liquid crystal can also be controlled. Problems of irreproducible domain morphology associated with the indiscriminate irradiation used in the prior art are eliminated. Higher yields in fabricating polymer dispersed liquid crystal devices are achieved.

The microlens produced is tuned by applying an electric field. The applied electric field changes the orientation of the liquid crystal director. In the absence on an external electric field, the liquid crystal directors are randomly oriented, causing light to scatter. When a voltage is applied across the liquid crystal micro-droplet, the liquid crystal directors tend to align toward the field of direction, i.e., along the droplet curvature near the surface, and tend to become straight near the center. The curvature of the liquid crystal alignment may be altered by the electric field applied, which in turn guides the incoming light waves to converge to a focal point. In this manner, the focal length can be tuned by controlling the applied voltage.

EXPERIMENTAL

The liquid crystal microlens forming process has been simulated on a pattern-photopolymerization technique in which the spatially modulated photo reaction rate coupled with time dependent Ginzburg-Landau (TDGL) Model C Equations by incorporating free energy densities of isotropic mixing, pneumatic ordering, and network elasticity. The reference liquid crystal system under consideration is a single component pneumatic, namely: 4-n-heptyl-4'-cyanobiphenyl (K21) having a pneumatic-isotropic transition temperature, TNI of 42EC, whereas the monomer is a multi-functional UV curable monomer, such as Norland Optical/Adhesive, NOA65. PLEASE PROVIDE THE NAME OF NOA65.

The photo-patterning process of the LC microlens may be modeled by mimicking spatio-temporal development of concentration and orientation order parameters of the LC in which a photoreaction rate equation is coupled with TDGL Model C, as described below:

$$\frac{\partial \varphi_M}{\partial t} = \nabla \cdot \left[\Lambda \nabla \frac{\delta F}{\delta \varphi_M}\right] + \eta_{\varphi_M} \text{ or } \frac{\partial \varphi_P}{\partial t} = \nabla \cdot \left[\Lambda \nabla \frac{\delta F}{\delta \varphi_P}\right] + \eta_{\varphi_P} \quad (1)$$

$$\frac{\partial \phi_L(r,t)}{\partial t} = \nabla \cdot \left[\Lambda \nabla \left(\frac{\delta G}{\delta \varphi_L}\right)\right] + \eta_\phi \quad (2)$$

$$\frac{\partial s(r,t)}{\partial t} = -R\left(\frac{\delta G}{\delta s}\right) + \eta_s \quad (3)$$

where $\phi_L(r,t)$ is the conserved concentration (volume fraction) order parameter of $L_C$ at position r and time t, whereas s(r,t) is the non-conserved orientation order parameter. If the monomer and polymer were immiscible, it is necessary to solve three-coupled equations, i.e., Eqs. (1)–(3), otherwise only two-coupled equations would be adequate, e.g., Eq. (3) with Eq. (1) or with Eq. (2). We chose Eqs. (2) and (3) in the simulation under the assumption that the monomers and the emerging polymer are miscible. Furthermore, the monomer, $\phi_M(r,t)$ and polymer, $\phi_P(r,t)$ concentration are related to $\phi_L(r,t)$ via the fractional conversion, α, viz. $\phi_M=(1-\alpha)(1-\phi_L)$ and $\phi_P=\alpha(1-\phi_L)$, respectively. Since the photopolymerization rate, dα/dt is proportional to the square root of UV intensity, $I_o$, it may be represented in the periodic form:

$$\frac{d\alpha}{dt} = k_o I_o^{1/2} \left[\cos\left(\frac{N_x \pi}{L}x\right) + \cos\left(\frac{N_y \pi}{L}y\right)\right](1-\alpha) \quad (4)$$

where $k_o$ is the reaction rate constant, $N_x$ and $N_y$ represent the number of layers related to the interference angles (or periodicity) in the horizontal and vertical directions, respectively, and L is the size of assumed square grid. Eq. (5) enables the fabrication of microlens array with spherical droplets ($N_x=N_y$) or with elliptical droplets ($N_x \neq N_y$). A represents the mutual diffusion coefficient having the property of Onsager reciprocity, while R is related to the rotational mobility. The quantities $\eta_\phi$ and $\eta_s$ are thermal noise in the respective concentration and orientation fields, while G is total free energy of the system, which may be written as:

$$G = \int_V [g(\phi_L, \phi_M, \phi_P, s) + \kappa_\varphi |\nabla \varphi_L|^2 + \kappa_s |\nabla S|^2] dv \quad (5)$$

where $g(\phi_L, \phi_M, \phi_P, S)$ or "g," for brevity, is the local free energy density of the system. The terms $\kappa_\phi |\nabla \phi_L|^2$ and $\kappa_g |\nabla s|^2$ are non-local terms associated with the gradients of the LC concentration and orientation order parameters, respectively, while $\kappa_\phi$ and $\kappa_g$ are the corresponding interface gradient coefficients. The local free energy density, g, may be expressed as the sum of the isotropic mixing ($g^i$), nematic ordering ($g^n$), and elastic ($g^n$) free energy densities. The free energy density of isotropic mixing, $g^i$ may be described in the context of the Flory-Huggins theory extended to a three-component system as follows:

$$g^i \phi_L \ln \phi_L + \phi_M + \chi(\phi_L \phi_M + \phi_L \phi_P) \quad (6)$$

Eq. (6) assumes that the polymer is crosslinked so that the average degree of polymerization, $r_P$=, while segment lengths of LC, $r_L$ and monomer, $r_M$ are each taken as unity. It is also assumed that the monomer is miscible with polymer so that monomer-polymer interaction parameter, $\chi_{MP}$ may be taken as zero, while LC-monomer and LC-polymer interaction parameters $\chi_{LM}$ and $\chi_{LP}$ respectively are assumed equal to χ. The nematic ordering free energy density, $g^n$ is given by the Maier-Saupe theory:

$$g^n = \frac{1}{r_L}\left(-\phi_L \ln z + \frac{1}{2}v\phi_L^2 s^2\right) \quad (7)$$

where v is the nematic interaction parameter related to the $T_{NI}$, while z and s are respectively the partition function and the LC order parameter. The elastic free energy, $g^e$ for a cross-linked polymer is given according to Dusek's approach:

$$g^e = \frac{3\alpha_e}{2r_e}\Phi_o^{2/3}(\phi_P^{1/3} - \phi_P) + \frac{\beta_e}{r_e}\phi_P \ln \phi_P \quad (8)$$

where $r_e$ is segment length between cross-linked point, while $\alpha_e$ and $\beta_e$ are network model constants. The parameter $\Phi_o$ in Eq. (8) is the network reference volume fraction, which gives $\Phi_o = \phi_P$ for in-situ crosslinking (the volume fraction at the onset of crosslinking).

Eqs (2) and (3) have been solved numerically using a finite difference method on a 128_128 square grid under specified initial boundary conditions. For the spatial step, a central difference discretization scheme was used, whereas an explicit forward difference discretization was utilized for the temporal step along with a periodic boundary condition. Prior to the simulation, the initial LC volume fractions, $\phi_L(r, 0)$ at grid points was calculated by adding random thermal noise satisfying the fluctuation dissipation theorem, then s(r,0) was determined from the known $\phi_L(r, 0)$. By marching forward in time, values of $\phi_L(r, t)$ and s(r, t) at all grid points were computed.

Figure 2:
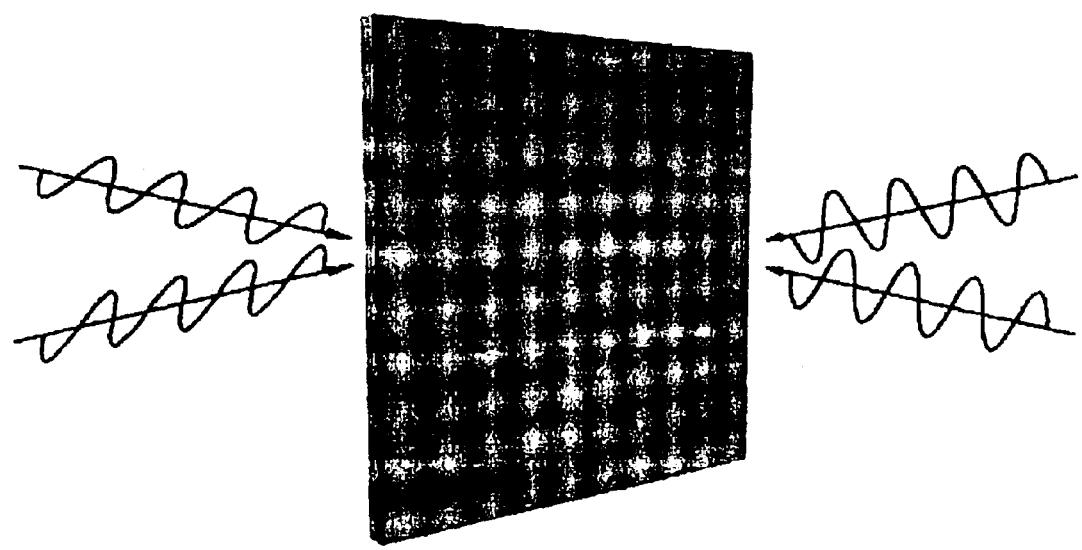
FIG. 2 is an enlarged, cross-sectional, schematic view of a four-wave mixing technique for fabricating a LC microlens, wherein it should be appreciated that four orthogonal waves may alternatively be applied from one side.

FIG. 2 exhibits a schematic diagram of the four-wave mixing technique for fabricating LC microlens 10 in which two electromagnetic waves 12 are mixed to form interference striations in the horizontal direction while the other two electromagnetic waves 14 generate interference striations in the vertical direction. The horizontal and vertical striations are then impinged on the sample to generate droplet array 16 patterns in the sample plane. Polymerization occurs preferentially in the high intensity regions due to the fast photo-reaction rate that makes LC molecules diffuse into the low intensity regions and form droplets. As the size of the LC domains is controllable by maneuvering the interference angles of the waves, a uniform array of microlens may be obtained.

Figure 3:
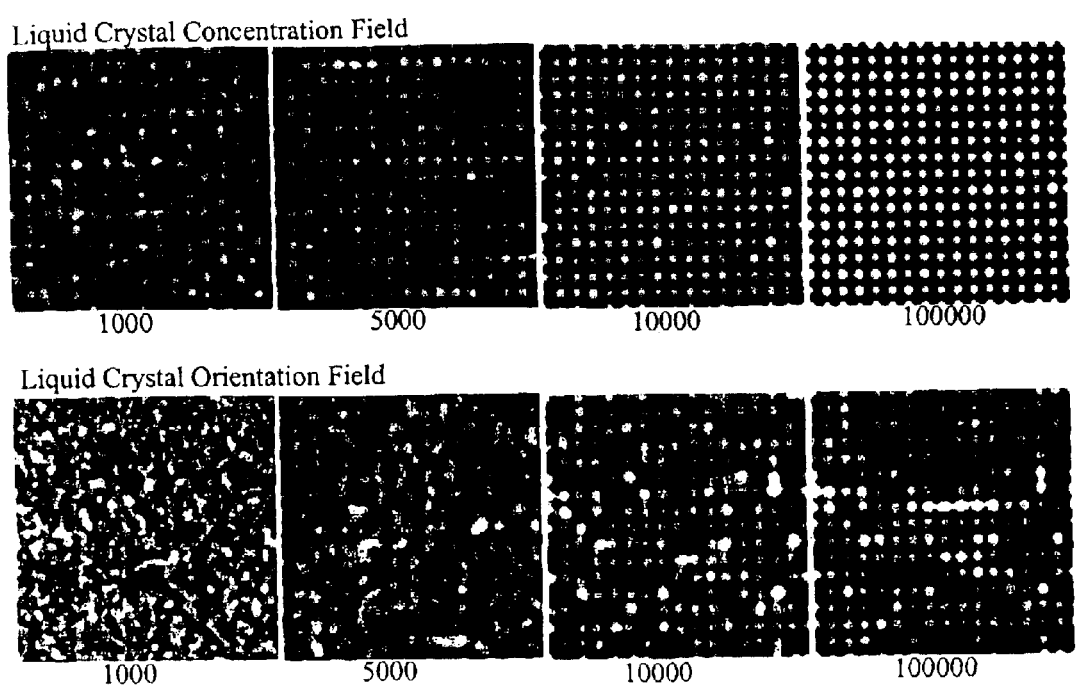
FIG. 3 displays snapshots of the emergence of a hypothetical LC microlens, showing droplet array patterns.

FIG. 3 displays snapshots of the emergence of a hypothetical LC microlens showing droplet array patterns. The parameters used in the hypothetical were: $\phi_L$=0.75, T=30 C, $k_o$=$10^{-4}$, $I_o$=1, and $N_x$=$N_y$=16. The upper row of FIG. 3 shows the emerging patterns in the concentration order parameter field, while the lower row represents those in the orientation order parameter field. Note that the temperature of 30° C. corresponds to the isotropic state of the starting LC/monomer mixture. The domain pattern in the concentration order parameter field that emerged from the pattern-photopolymerization induced phase separation (1,000 steps) appears connected initially. With elapsed time, the spherical LC droplets eventually arrange themselves in the form of droplet arrays ($10^4$~$10^5$ time steps). The LC ordering seemingly lags behind that of the concentration, showing a spinodal-like modulated pattern initially, but the texture eventually evolves into the droplet arrays at later times. It should be noted in the simulation that only LC and monomer are allowed to diffuse, while the polymer is presumably fixed due to the network formation.

Figure 4:
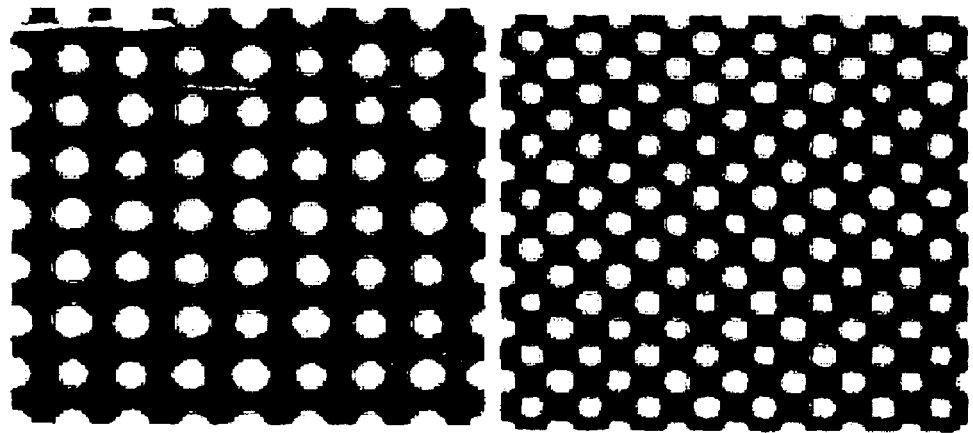
FIG. 4 displays various simulated morphological patterns of LC microlens with spherical and elliptical droplets arranged in an array or a checkerboard pattern, with their corresponding elliptical droplets in the corresponding lower row.
Figure 4:
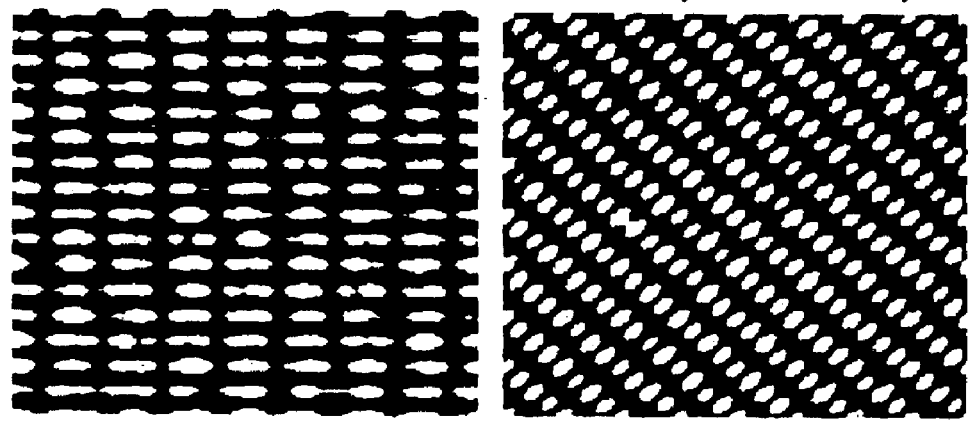

FIG. 4 displays various simulated morphological patterns of LC microlens with spherical and elliptical droplets arranged in an array (upper left) or a checkerboard (upper right) pattern, and their corresponding elliptical droplets (corresponding lower row). The parameters used were $N_x$=$N_y$=8 for the spherical droplets (upper row) and $N_x$=16, $N_y$=8 for the elliptical droplets (lower row). The dimensionless time step is $10^5$ in all cases. In the simulation of FIG. 4, one can envisage the emergence of microlens with varying shapes, viz., spherical or elliptical. As seen in the upper left of FIG. 3, the interference of two vertical waves gives rise to the array of spherical microlens when $N_x$=$N_y$=8. However, when the two sets of these interference waves were applied in the diagonal direction, a checkerboard pattern may be generated (upper right). If the interference angle (or the wavelength) of the horizontal waves is different from those of the vertical waves, say $N_x$=16, $N_y$=8, the elliptical microlens arrays (lower row) may be obtained. As is well known, the size of the microlens depends on the choice of the length scale, the characteristic time, and the mutual diffusion coefficient. Assuming the diffusivity to be $10^{-6}$ $cm^2/s$ (for monomer and/or low molecular weight LC) and the characteristic time for H-PDLC to be 0.0001 s, then the estimated characteristic size would be of the order of 0.1 $\mu$m. Hence, the calculated picture frame (128×128) would be approximately 12.8 $\mu$m; so the estimated size (diameter) of the microlens would be about 800 $\mu$m. Although the estimated size is larger than the reported experimental value of 300 nm for an H-PDLC, it is much smaller than the size (a few hundred micrometers) reported for the existing microlens fabricated by other methods.

With appropriate configurations of the holographic optics, the size and shape of the LC microlens may be varied through control of the interference angles and/or wavelengths, the reaction rate as determined by the incident UV intensity, and/or the pattern profiles. The focal length of the LC microlens may be tuned by maneuvering the director orientation of LC through appropriate applied voltage. The electrically focusable microlens are particularly useful when the object being imaged is not in a fixed position. Another important feature is that flexible ITO coated polymeric films nay be used to arrange the arrays of the LC microlens in the convex shape so that these LC microlens would be similar to the compound lens found in the eyes of some insects such as flies, ants, and/or wasps.

In summary, the present invention demonstrates the feasibility of fabricating electrically tunable LC microlens via photopolymerization-induced phase separation of LC/monomer mixtures using multiple-wave mixing as based on the time dependent Ginzburg-Landau (TDGL) Model C equation coupled with a spatially modulated photopolymerization rate equation. Simulated results showed that depending on the interference angles or the periodicity (wavelengths) of the horizontal and vertical waves, LC microlens arrays may be fabricated to produce spherical (or elliptical) droplet arrays or checkerboard patterns.

The polymer dispersed liquid crystals prepared by the process of the present invention comprise well ordered alignments of microdroplet arrays, and can be used as switchable microlens arrays with tunable focal lengths. Said electrically tunable microlens arrays are similar in structure to the cornea of fly eyes. Sharper images are produced relative to liquid crystal devices prepared by conventional methods. The electrically tunable microlens arrays of the present invention may be used in imaging of all kinds, including zoom lens charge coupled detector (CCD) cameras, video, CCD, tunable 2-D or 3-D diffractive gratings, and the like, and can provide a larger storage memory.

The present invention is not limited to the specific embodiments described above, but includes variations, modifications and equivalent embodiments defied by the following class.

We claim:

1. An electrically tunable microlens array prepared by pattern photopolymerization of a photoreactive mixture comprising a polymerizable material and liquid crystals, wherein the photopolymerization is characterized by the interaction of multiple-wave mixing.

2. The electrically tunable microlens array of claim 1, wherein the polymerizable material is selected from single and multi-functional monomers and oligomers capable of being photopolymerized either alone or with suitable photoinitiator dyes.

3. The electrically tunable microlens array of claim 2, wherein the polymerizable material is selected from acrylates, methacrylates, thiols, alkyl ethers, aromatic analogs of the preceeding, and mixtures thereof.

4. The electrically tunable microlens array of claim 2, wherein the polymerizable material is selected from dimers, trimers, tetramers of acrylates, methacrylates, thiols, alkyl ethers, aromatic analogs of the preceeding, and mixtures thereof.

5. The electrically tunable microlens array of claim 1, wherein the polymerizable material makes up from about 2 to 80% by weight of the microlens array.

6. The electrically tunable microlens array of claim 1, wherein the liquid crystals are selected from nematic liquid crystals, cholesteric liquid crystals, smectic liquid crystals, ferro-electric liquid crystals, antiferro-electric liquid crystals, and mixtures thereof.

* * * * *